United States Patent

[11] 3,569,904

[72] Inventors Cortland P. Hill
Vestal;
John R. Mankus, Endicott, N.Y.

[21] Appl. No. 776,454
[22] Filed Nov. 18, 1968
[45] Patented Mar. 9, 1971

[73] Assignee International Business Machines Corporation
Armonk, N.Y.

[54] ELECTRICAL HOUSING AND LEVER ACTUATING APPARATUS
5 Claims, 5 Drawing Figs.

[52] U.S. Cl. .......... 339/75, 339/176
[51] Int. Cl. .......... H01r 13/54
[50] Field of Search .......... 339/74, 75, 176

[56] References Cited

UNITED STATES PATENTS

| | | | |
|---|---|---|---|
| 2,802,189 | 8/1957 | Bishop et al. .......... | 339/18 |
| 2,857,577 | 10/1958 | Vanderpool .......... | 339/17 |
| 3,130,351 | 4/1964 | Giel .......... | 317/101 |
| 3,329,926 | 7/1967 | Aksu et al. .......... | 339/176 |

*Primary Examiner*—Marvin A. Champion
*Assistant Examiner*—Joseph H, McGlynn
*Attorneys*—Hanifin and Jancin and Charles S. Neave

ABSTRACT: An actuating crank and electrical connector housing lever apparatus which enables (1) the holding and releasing of printed circuit cards, boards or the like, and (2) a convenient transverse insertion or extraction of the cards into and from the housing. The actuating crank features self locking within the lever and, through the camming action designed therein, can move the lever from a latched to an unlatched position or, conversely, by a cranking turn through an arc of approximately 210°.

INVENTORS
CORTLAND P. HILL
JOHN R. MANKUS
BY [signature]
AGENT

ELECTRICAL HOUSING AND LEVER ACTUATING APPARATUS

BACKGROUND OF THE INVENTION

1. Field of the Invention

This invention relates to an actuating crank adapted to be inserted into an aperture formed in a depending arm of an electrical connector housing lever to provide a self-locking function for the crank and a latching and unlatching function for the lever.

2. Description of the Prior Art

Various arrangements are existing in the prior art for releasably receiving, holding and making electrical edge connections with printed circuit boards or panels having printed circuitry thereon. Such boards may have to be inserted into and withdrawn from the edge connectors many times in a sliding, rubbing engagement between the board and contacts during insertion. Withdrawal has resulted in the circuitry on the boards becoming worn or damaged. The ever increasing trend toward microminiaturization, diminutive wire and close lead spacing, as well as the fragile nature of the boards and circuitry thereon introduces considerable difficulty in the handling of the boards. There is even greater difficulty when attempting to introduce or extract a board in a direction transverse to the holder.

SUMMARY OF THE INVENTION

A primary object of the present invention is to overcome the above-noted difficulties. The present invention provides a printed circuit board edge connector assembly comprising a connector housing adapted to accommodate a plurality of contacts for connecting with the edge connectors of a printed circuit board, a stiffener to which is pivotally attached a lever for supporting the housing, and a unique lever actuating crank that is self-locking within a depending arm of the lever and which functions to releasably hold the lever so that a printed circuit board may be easily inserted into or extracted from the housing in a transverse direction relative to the contacts. The actuating crank is pivoted in the stiffener and includes a camming portion for moving the lever toward and away from the stiffener, as well as a slotted hexagonal head adapted for tool-applied operational force to pivotally move the crank through an arc of about 210° plus or minus 10°.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figures 1, 2, 3, 4, 5:
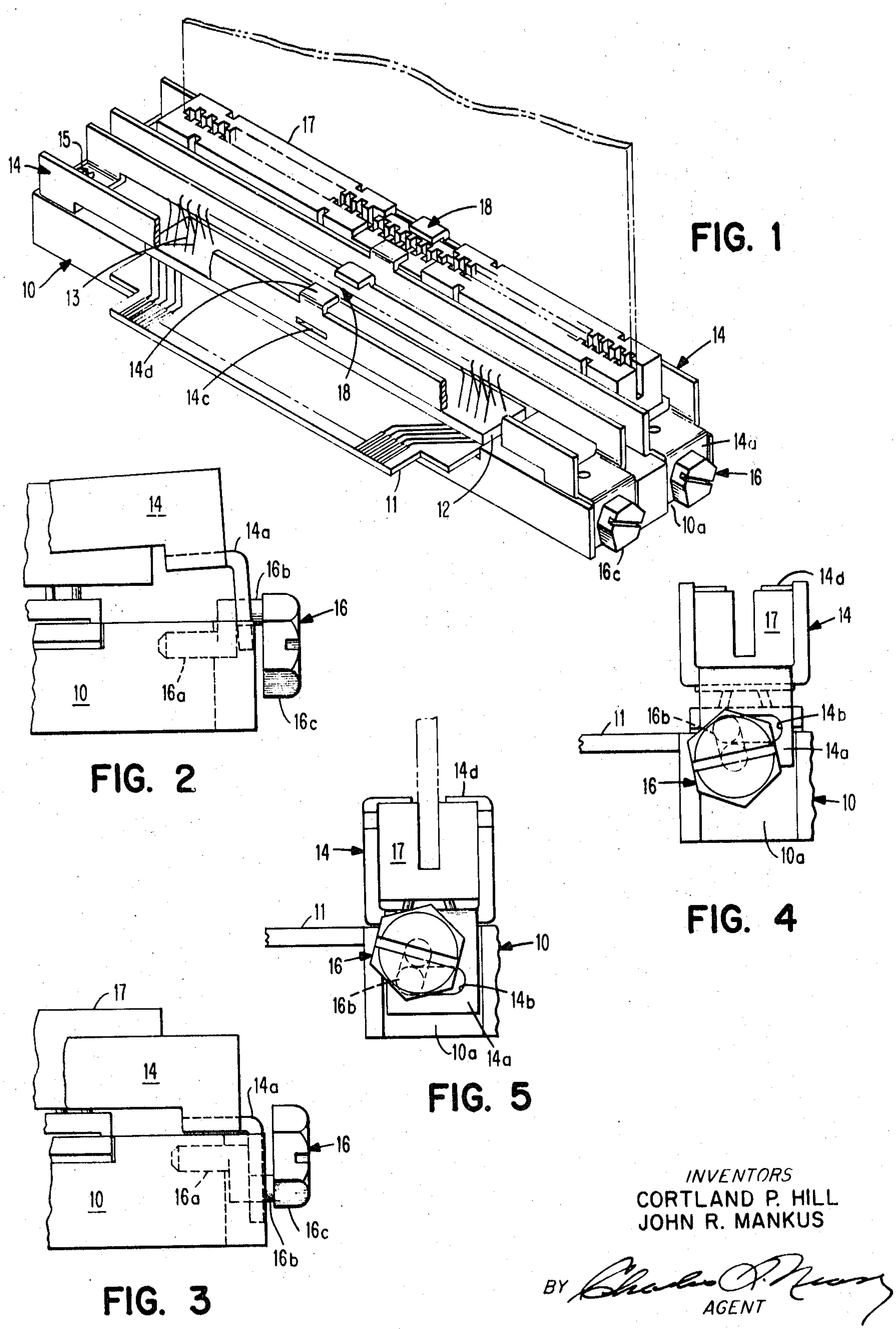
FIG. 1 is an isometric view of an actuating crank and electrical connector housing lever assembly according to the present invention.
FIG. 2 is a side elevation view of the actuating crank with the housing lever in an open or unlocked position.
FIG. 3 is a side elevation view of the actuating crank with the lever in a closed or locked position.
FIG. 4 is a front elevation view of the actuating crank with the lever in an open or unlocked position.
FIG. 5 is a front elevation view of the actuating crank with the lever in a closed or locked position.

Referring to the drawings, in FIG. 1 there is shown an actuating crank and electrical connector housing lever assembly adapted to accommodate two printed circuit boards (one shown in phantom). It may be noted that while only two positions are shown, other accommodating arrangements are possible for a single board or a plurality of boards in side-by-side relationships. The assembly, according to the present invention, comprises a stiffener member 10 to which is attached s distribution board 11 and a pin carrier board 12. The pin carrier board 12 supports rows of pin connectors 13 with each row having a plurality of pairs of opposing pins 13 that are adapted to make electrical connections with the edge connectors of a printed circuit board inserted between the pairs of opposing pins 13. A row of singular pins could be adapted to contact one side of the printed circuit board without departing from the spirit of the invention. The function of the distribution board 11 is to make electrical connection with other equipment of a data processing system not shown herein.

The assembly also includes a lever 14 attached at one end to the stiffener member 10 by means of screw 15. At the other end, lever 14 is held and actuated relative to stiffener member 10 by means of a unique and novel actuating crank 16 as shown in the drawings of FIGS. 1 through 5. As shown in FIGS. 2 and 3, actuating crank 16 is pivotally supported in the stiffener member 10 by means of the pivot shaft **16*a*. The camming portion 16*b* is embraced within an aperture 14*b* in the depending lever arm 14*a*. A slotted and hexagonal head 16*c* is formed to the actuating end of the actuating crank 16 so that it may be rotated by a tool applied thereto. The arc of rotation for the actuating crank in the preferred embodiment is in the range of about 200° to 220°, so that in the extreme clockwise position, as shown in FIGS. 3 and 5, the lever 14 will be in its downward or closed or latched position relative to stiffener member 10. In the extreme counterclockwise position, as shown in FIGS. 2 and 4, the lever 14** will be in its upward, open or unlatched position.

The housing member 17 of dielectric material is pivotally supported at point 18 of lever 14 by means of inwardly bent portions **14*c* and depending arms 14*d* of lever 14 which function to apply a downward pressure on housing 17 when lever 14 is moved to its downward or closed position. This action causes housing 17 to apply an inward or closing pressure to pins 13 and thereby establish electrical connection with the edge connectors of a printed circuit board when the latter has been inserted into position within housing 17**.

Stiffener member 10 includes a recess **10*a* which functions as a guide for the lever arm 14*a* during movement of lever 14** between its latched and unlatched positions.

The assembly of the preferred embodiment is particularly adapted for the storing and holding of printed circuit boards in an elaborate electrical or electronic system and wherein the storing medium may be accessible from one end only. To this type of storage the disclosed assembly has a number of significant features. Printed circuit boards are easily inserted into the housing in a transverse manner with respect to the edge connectors on the printed circuit boards and the pins 13 without contacting of the electrical conductive elements on the printed circuit boards. After insertion, the electric contact is made by movement of the actuating crank 16. The use of a tool-actuated crank permits the endwise insertion of the printed circuit boards without interference of a crank arm or the like. The assembly of the preferred embodiment provides a positive and uniform application of pressure to housing 17, thereby establishing good electrical connections between the pins 13 and the electrical connections between the pins 13 and the electrical edge connectors of the printed circuit boards.

While the invention has been particularly shown and described with reference to a preferred embodiment thereof, it will be understood by those skilled in the art that the foregoing and other changes in form and details may be made therein without departing from the spirit and scope of the invention.

We claim:

1. Electrical edge connecting apparatus for printed circuit boards, the combination comprising:
   - a. a base member;
   - b. an electrical pin carrier board attached to the base member and having a plurality of printed circuit board edge connecting pins extending from the board;
   - c. a housing for embracing the connecting pins and for biasing the free ends of the pins into contact with the edge connectors of a printed circuit board inserted between the plurality of contacting pins;

d. a lever which supports the housing and which is pivotally attached at one end to the base member and including a depending arm provided with an aperture adapted to receive an actuating crank for moving the lever between latched and unlatched positions;

e. a lever-actuating means comprising a crank including a crankshaft, a crank arm, a crank pin, and a head adapted to be moved by tool means for moving the other end of the lever between latched and unlatched positions relative to the base member;

f. a guide recess included in said base member functioning to guide the depending arm of the lever between the latched and unlatched positions; and g. a distribution board mounted between said base member and said pin carrier board and adapted to electrically mate with the pins mounted in the pin carrier board.

2. Electrical edge connecting apparatus for printed circuit boards as defined in claim 1 wherein the housing is made of dielectric material.

3. Electrical edge connecting apparatus for printed circuit boards comprising:

a. a base member;

b. an electrical pin carrier board attached to the base member and having a plurality of pairs of printed circuit board edge contacting pins extending from the board;

c. a pin actuator and housing member;

d. an actuating crank; and e. a lever means supporting the pin actuator and housing member and pivotally connected at one end to the base member and the other end of the lever means having a depending arm provided with an aperture adapted to receive the actuating crank for camably moving the lever between latched and unlatched positions.

4. An electrical edge connecting apparatus for printed circuit boards as defined in claim 3 wherein the actuating crank includes a head adapted for rotatable movement by tool means.

5. Electrical edge connecting apparatus for printed circuit boards as defined in claim 4 wherein the base member includes a guide recess for the depending lever arm to guide same during movement of the lever between latched and unlatched positions.